United States Patent
Ohta

(10) Patent No.: US 10,427,603 B2
(45) Date of Patent: Oct. 1, 2019

(54) DISPLAY CONTROL DEVICE AND DISPLAY CONTROL METHOD

(71) Applicant: DENSO CORPORATION, Kariya, Aichi-pref. (JP)

(72) Inventor: Kazuhide Ohta, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 16/062,480

(22) PCT Filed: Dec. 15, 2016

(86) PCT No.: PCT/JP2016/087439
§ 371 (c)(1),
(2) Date: Jun. 14, 2018

(87) PCT Pub. No.: WO2017/104768
PCT Pub. Date: Jun. 22, 2017

(65) Prior Publication Data
US 2018/0361933 A1  Dec. 20, 2018

(30) Foreign Application Priority Data

Dec. 18, 2015  (JP) .................................. 2015-247714

(51) Int. Cl.
*B60R 1/00*  (2006.01)
*G06T 7/30*  (2017.01)
(Continued)

(52) U.S. Cl.
CPC ............... *B60R 1/00* (2013.01); *B60K 35/00* (2013.01); *B60R 1/002* (2013.01); *G06T 7/30* (2017.01);
(Continued)

(58) Field of Classification Search
CPC ............... B60R 1/00; B60R 2300/105; B60R 2300/302; B60R 2300/607; B60R 1/002; G06T 7/30; B60K 35/00; H04N 7/181
See application file for complete search history.

(56) References Cited

U.S. PATENT DOCUMENTS

2003/0165255 A1  9/2003 Yanagawa et al.
2009/0102921 A1* 4/2009 Ito ............................ B60R 1/00
348/148
(Continued)

FOREIGN PATENT DOCUMENTS

JP  2002-373327  12/2002
JP  2012-134586  7/2012

*Primary Examiner* — John R Schnurr
(74) *Attorney, Agent, or Firm* — Knobbe, Martens, Olson & Bear, LLP

(57) ABSTRACT

In a display control device, a viewpoint conversion unit converts the viewpoint of images captured by cameras to obtain viewpoint converted images as viewed from above the own vehicle. A steering determination unit determines whether the steering angle of a wheel of the own vehicle is equal to or greater than a predetermined value. When the steering angle is equal to or greater than the predetermined value, an image correction unit creates a corrected image by processing a viewpoint converted image of the wheel in the viewpoint converted image so that the image of the wheel is prevented from being displayed. The image synthesis unit combines the corrected image and the other viewpoint converted images to create a synthesized image. The display control unit displays the synthesized image and an image of the own vehicle on a display device.

20 Claims, 8 Drawing Sheets

(51) Int. Cl.
*B60K 35/00* (2006.01)
*H04N 7/18* (2006.01)
(52) U.S. Cl.
CPC ........ *H04N 7/181* (2013.01); *B60R 2300/105* (2013.01); *B60R 2300/302* (2013.01); *B60R 2300/607* (2013.01)

(56) References Cited

U.S. PATENT DOCUMENTS

| | | | |
|---|---|---|---|
| 2009/0143967 A1* | 6/2009 | Lee | B60R 1/00 701/119 |
| 2010/0245577 A1* | 9/2010 | Yamamoto | B60R 1/00 348/148 |
| 2012/0242834 A1* | 9/2012 | Satoh | B60R 1/00 348/148 |
| 2016/0001704 A1* | 1/2016 | Nakasho | G07C 5/0891 701/36 |
| 2018/0040151 A1* | 2/2018 | McCullough | B60R 1/00 |
| 2018/0111553 A1* | 4/2018 | Kubota | B60R 1/00 |
| 2018/0115707 A1* | 4/2018 | Liepelt | G06T 3/4038 |

* cited by examiner

DISPLAY CONTROL DEVICE AND DISPLAY CONTROL METHOD

CROSS REFERENCE TO RELATED APPLICATION

This application is based on Japanese Patent Application No. 2015-247714 filed on Dec. 18, 2015, the contents of which are incorporated herein by reference.

BACKGROUND

Technical Field

The present disclosure relates to a display control device and display control method for vehicles.

Background Art

As described in, for example, PTL 1, a display control device for a vehicle is known which captures images of the surroundings of the vehicle with a plurality of cameras mounted on the vehicle, and converts the viewpoint of the captured images to create viewpoint converted images as viewed downward from above the vehicle, for example, as viewed directly downward from above or diagonally downward from above. In the following description, viewpoint conversion may also be referred to as bird's-eye view conversion and viewpoint converted images may also be referred to as bird's-eye view images.

In this display control device, the bird's-eye view images captured by a plurality of cameras are synthesized to a synthesized image, and the synthesized image is displayed on a display device. Normally, at the center of the synthesized image, a plan view image of the vehicle is displayed.

CITATION LIST

Patent Literature

[PTL 1] JP 2012-134586 A

When the vehicle is steered largely, and, for example, a bird's-eye view image is produced from an image captured by a camera on one side of the vehicle (for example, the left camera), a wheel in the bird's-eye view image may look unnatural to the viewer.

Specifically, the image will show the wheel on one side of the image of the own vehicle in such a manner that the wheel is distorted and protruding diagonally forward from a position shifted slightly forward from the correct position of the wheel (for example, the front wheel), and thus the synthesized image displayed as it is may look unnatural to the viewer.

The reason for this is considered that since the position of the wheel is higher than the road surface and the wheel is captured near the limit of the captured range of the camera, when the captured image is converted into a bird's-eye view image, distortion, positional shifting, and the like tend to occur in the image of the wheel.

SUMMARY

An object of the present disclosure is to provide a technique capable of reducing unnaturalness in a viewpoint-converted image of the surroundings of a vehicle during displaying the image.

A first aspect of the present disclosure includes a viewpoint conversion unit, a steering determination unit, an image correction unit, an image synthesis unit, and a display control unit.

The viewpoint conversion unit converts a viewpoint of images captured by a plurality of cameras mounted on an own vehicle to obtain viewpoint converted images as viewed from above the own vehicle;

The steering determination unit determines whether the steering angle of a wheel of the own vehicle is equal to or greater than a predetermined value.

When the steering angle is equal to or greater than the predetermined value, the image correction unit creates a corrected image by processing a viewpoint converted image of the wheel in the viewpoint converted image so that display of the image of the wheel is suppressed.

The image synthesis unit combines the corrected image and the other viewpoint converted images different from the corrected image to create a synthesized image.

The display control unit displays, on a display device, the synthesized image and also an image of the own vehicle at the position of the own vehicle set according to the synthesized image.

According to such configuration, for example, when the vehicle is steered largely, and thus the steering angle of a wheel is increased, the image of the wheel that looks unnatural to the viewer can be prevented from being displayed in the synthesized image showing the surroundings of the vehicle. For example, it is possible to avoid displaying a part or the whole of the image of the wheel, or to make the display of the image of the wheel inconspicuous.

In other words, for example, displaying a wheel deformed such that it protrudes greatly in a diagonal direction from a position different from the normal position of the wheel is prevented from being displayed in the synthesized image obtained from viewpoint converted images.

Therefore, even when a passenger in the vehicle views the synthesized image displayed on the display device, he or she is unlikely to feel a sense of wrongness.

It should be noted that this section merely indicates correspondence with specific means described in embodiments set forth below as modes, and does not limit the technical scope of the present invention.

BRIEF DESCRIPTION OF THE DRAWINGS

The above and other objects, features, and advantages of the present disclosure will become clearer from the following detailed description with reference to the accompanying drawings. In the accompanying drawings.

DESCRIPTION OF THE EMBODIMENTS

Embodiments of the present invention will be described with reference to the drawings.

[1. First Embodiment]

[1-1. Configuration]

First, the system configuration of a display control device and display control method of the first embodiment will be described.

Figure 1:
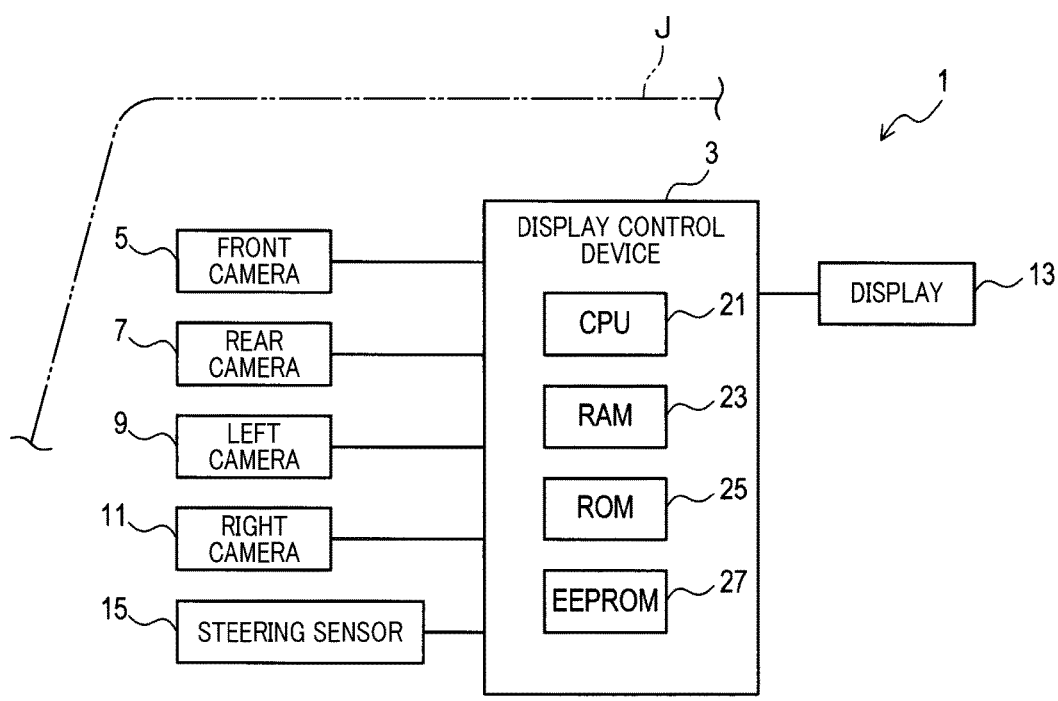
FIG. 1 is a block diagram showing an in-vehicle system including a display control device according to a first embodiment.
Figure 2:
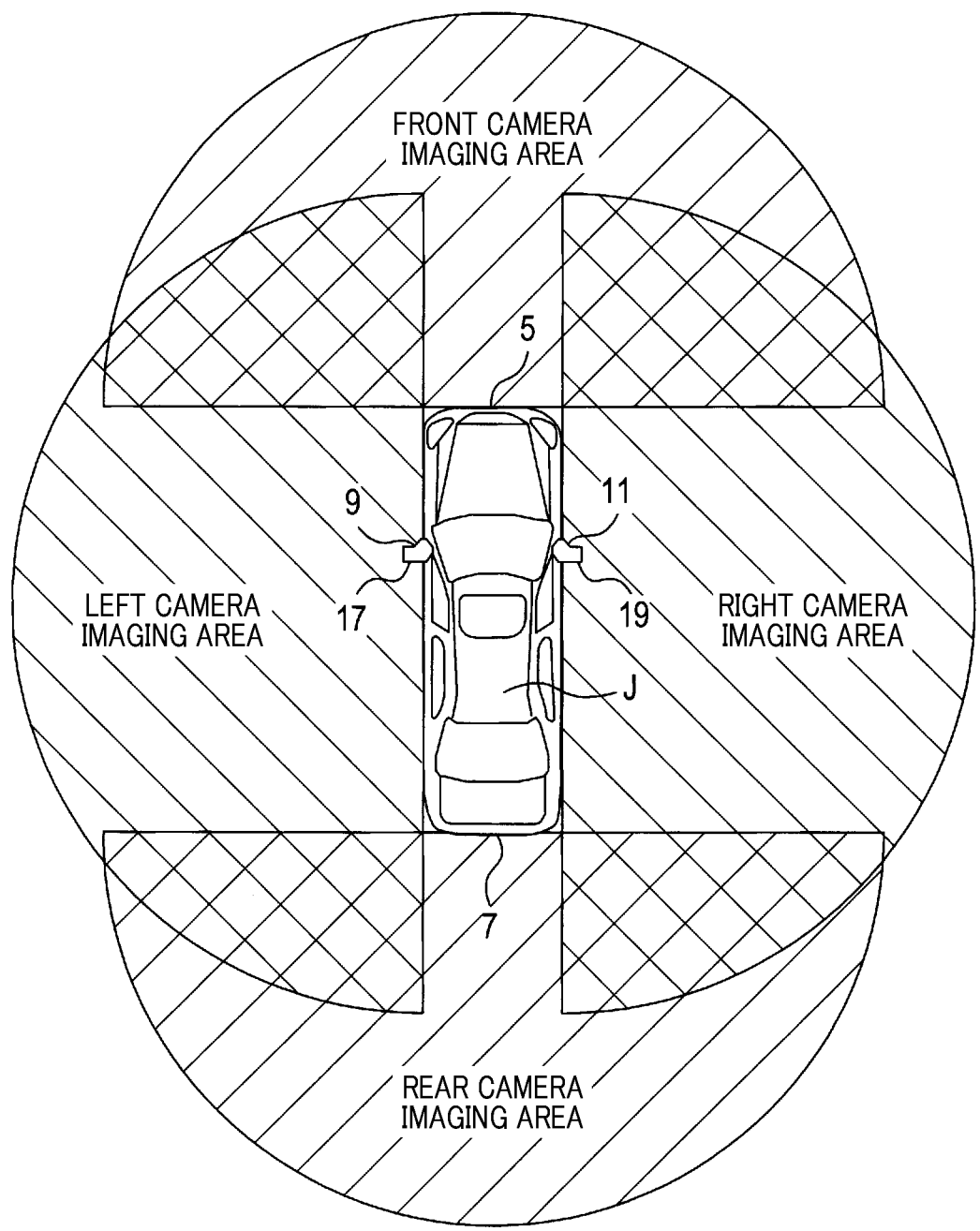
FIG. 2 is a plan view schematically showing the imaging area of each camera.

As shown in FIGS. 1 and 2, an in-vehicle system 1 according to the first embodiment is a system wherein a display control device 3 produces a synthesized image using images captured by a plurality of cameras 5, 7, 9, and 11 mounted on a vehicle (that is, the own vehicle) 3, and displays the synthesized image on a display 13. That is, the in-vehicle system 1 is a system that creates a synthesized image based on images of the surroundings of the own vehicle J itself and displays the synthesized image on the display 13.

More specifically, the in-vehicle system 1 includes a display control device 3, a plurality of cameras 5 to 11, a display 13, a steering sensor 15, and the like.

The plurality of cameras 5 to 11 may be, for example, well-known CCD (Charged-Coupled Device) cameras. The cameras 5 to 11 includes a front camera 5 for capturing an image of an area ahead of the own vehicle J, a rear camera 7 for capturing an image of an area behind of the own vehicle J, a left camera 9 for capturing an image of an area on the left side of the own vehicle J, and a right camera 11 for capturing an image of an area on the right side of the own vehicle J.

Among these cameras, the front camera 5 is attached to the front part of the own vehicle J, and the rear camera 7 is attached to the rear part of the own vehicle J. The left camera 9 is attached to the lower part of a left side mirror 17 and the right camera 11 is attached to the lower part of a right side mirror 19.

In FIG. 2, the imaging areas of the cameras 5 to 11 are schematically shown as having generally semicircular shapes, but the shapes and sizes of the imaging areas of the cameras 5 to 11 are not limited and can be decided arbitrarily.

Further, each of the cameras 5 to 11 is configured to capture an image every predetermined time period (for example, every 33 ms), and send the captured image (that is, the camera image) to the display control device 3.

A steering sensor 15 is a well-known sensor for detecting the angle of the wheels controlled by handling a steering wheel (not shown), that is, the steering angle. Here, an example case is shown where the steering angle of the front wheels is changed by handling the steering wheel. The steering angle will be represented by the absolute value for both left and right.

When turning the steering wheel (that is, when the steering wheel is moved) to the left, the direction of the wheels (that is, the front wheels) is changed in correspondence with the rotation angle to the left with respect to the front-rear direction of the own vehicle J at a certain steering angle as viewed in a plan view from above the own vehicle J. That is, the front sides of the front wheels move to the left.

Similarly, when turning the steering wheel to the right, the direction of the wheels is changed in correspondence with the rotation angle to the right with respect to the front-rear direction of the own vehicle J at a certain steering angle. That is, the front sides of the front wheels move to the right.

Although a case is shown here where the left and right front wheels of the vehicle are changed by handling the steering wheel, the present invention is not limited to this. That is, it can be applied to a case where the steering angle of the left and right rear wheels is changed.

The display 13 is a well-known display that displays an image based on a video signal sent from the display control device 3. On the display screen of the display 13, as will be described later, images such as a viewpoint converted image obtained by converting the viewpoint of the camera images of the surroundings of the own vehicle J captured by the cameras 5 to 11 are displayed.

The display control device 3 is an electronic control device, mainly composed of a well-known microcomputer including a CPU (Central Processing Unit) 21, a RAM (Random Access Memory) 23, a ROM (Read Only Memory) 25 and the like. The display control device 3 further includes an EEPROM (Electrically Erasable Programmable Read-Only Memory) 27.

Among these, the ROM 25 stores data and programs of which storage contents need to be held even after the power is turned off. The EEPROM 27 stores data (for example, image data) of which storage contents need to be held even after the power is turned off. The RAM 23 stores data temporarily. The CPU 21 executes processing according to a program or the like stored in the ROM 25, etc.

As will be described later, the ROM 25 stores a processing program for executing a process for converting the viewpoint of the camera images captured by the cameras 5 to 11 to create viewpoint converted images, creating a synthesized image based on the viewpoint converted images, and displaying the synthesized image, etc. on the display 13.

Figure 3:
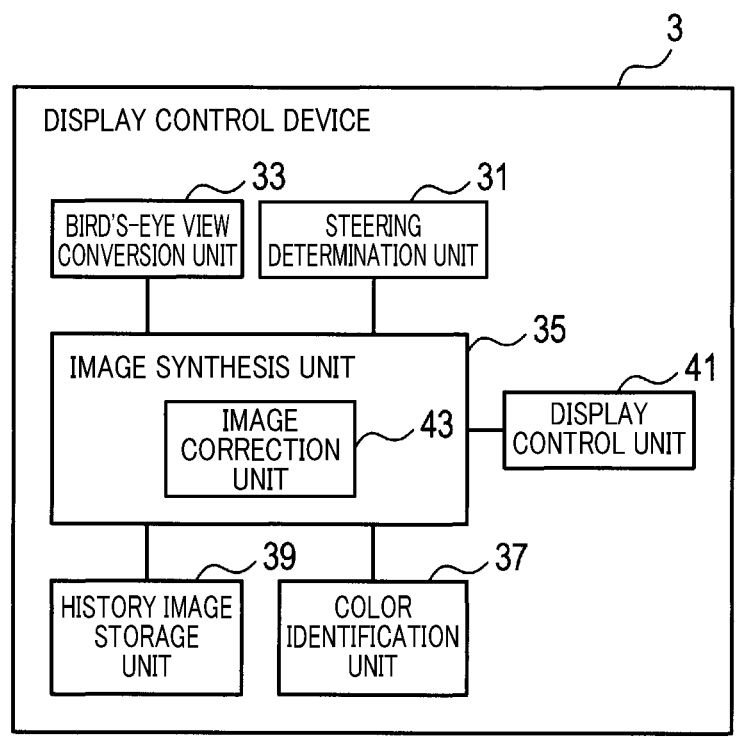
FIG. 3 is a block diagram functionally showing the display control device.

As shown in FIG. 3, the display control device 3 includes, as the processing contents executed by the processing program, that is, functionally, a steering determination unit 31, a bird's-eye view conversion unit 33, an image synthesis unit 35, a color identification unit 37, a history image storage unit 39, and a display control unit 41. The image synthesis unit 35 includes an image correction unit 43.

Based on the signals sent from the steering sensor 15, the steering determination unit 31 determines whether the steering angle of the wheel is greater than or equal to a predetermined value with respect to the front-rear direction of the own vehicle J.

The bird's-eye view conversion unit 33 converts the viewpoint of the camera image captured by each of the cameras 5 to 11 so that the viewpoint will be as viewed from above the own vehicle J, for example, as viewed directly downward or diagonally downward from above, and creates viewpoint converted images. In the following description, viewpoint conversion will be assumed as bird's-eye view conversion and viewpoint converted images will be assumed as bird's-eye view images.

As will be described later in detail, the image correction unit 43 creates corrected images such as left corrected images and right corrected images, which are images obtained by replacing the masked area of the bird's-eye view image of the camera image captured by each of the cameras 5 to 11 with a replacement image.

A masked area is an area set for the bird's-eye view image including an image of a wheel, so that the area includes an area where the image of the wheel is displayed. Specifically, a masked area is defined as an area set so that it corresponds to an area displaying an image of a wheel in the left or right bird's-eye view image, and so that the image of the wheel is partly or entirely not displayed.

Further, the replacement image is another image displayed in place of the masked area so that the image of the wheel in the masked area is not displayed as it is. That is, it is an image such as a history image, which has been accumulated or an image entirely painted with a given color, which can prevent the display of the image of the wheel to make it less conspicuous.

Here, since a masked area is set for each of the bird's-eye view images of the left camera 9 and the right camera 11, respective corrected images of the bird's-eye images of the left camera 9 and the right camera 11 are created according to the manipulation state of the steering wheel.

The image synthesis unit 35 combines the bird's-eye view images obtained based on the camera images of the cameras 5 to 11 to create a synthesized image. Specifically, the front and rear bird's-eye view images captured by the front and rear cameras 5, 7 and the left and right corrected images captured by the left and right cameras 9, 11 are combined to create a synthesized image.

As will be described later, the color identification unit 37 detects the color of the road surface around the masked area in order to display a replacement image at the masked area.

The history image storage unit 39 stores images captured by the cameras 5 to 11 in the past in order to display a history image as a replacement image at the masked area. Specifically, the history image storage unit stores each of the bird's-eye view images of the camera images captured by the left camera 9 and the right camera 11 including masked areas. It should be noted that only the image of the masked area of each bird's-eye view image may be stored as a history image.

This history image is a previous bird's-eye view image captured by the left camera 9 or the right camera 11, in particular, a previous image in which the image of the front wheel is not displayed or the image of the front wheel is minor enough such that it does not create a sense of discomfort in the corresponding bird's-eye view image. This history image may be an image produced when the steering angle is less than a predetermined value. For example, the history image may be an image produced when the vehicle is not steered at all, and thus the wheels cannot be seen at all.

As will be described later, the display control unit 41 controls displaying images such as synthesized images including corrected images on the display 13.

The various functions of the display control device 3 are achieved by the CPU 21 executing programs stored in a non-transitory computer readable recording medium. In this example, the ROM 25 corresponds to the non-transitory computer readable recording medium for storing programs in advance. Further, a method corresponding to one or more programs is executed by execution of the one or more programs. The number of microcomputers constituting the display control device 3 may be one or greater.

[1-2. Display Screen]

Next, the image displayed on the display screen of the display 13 will be described.

Figure 4:
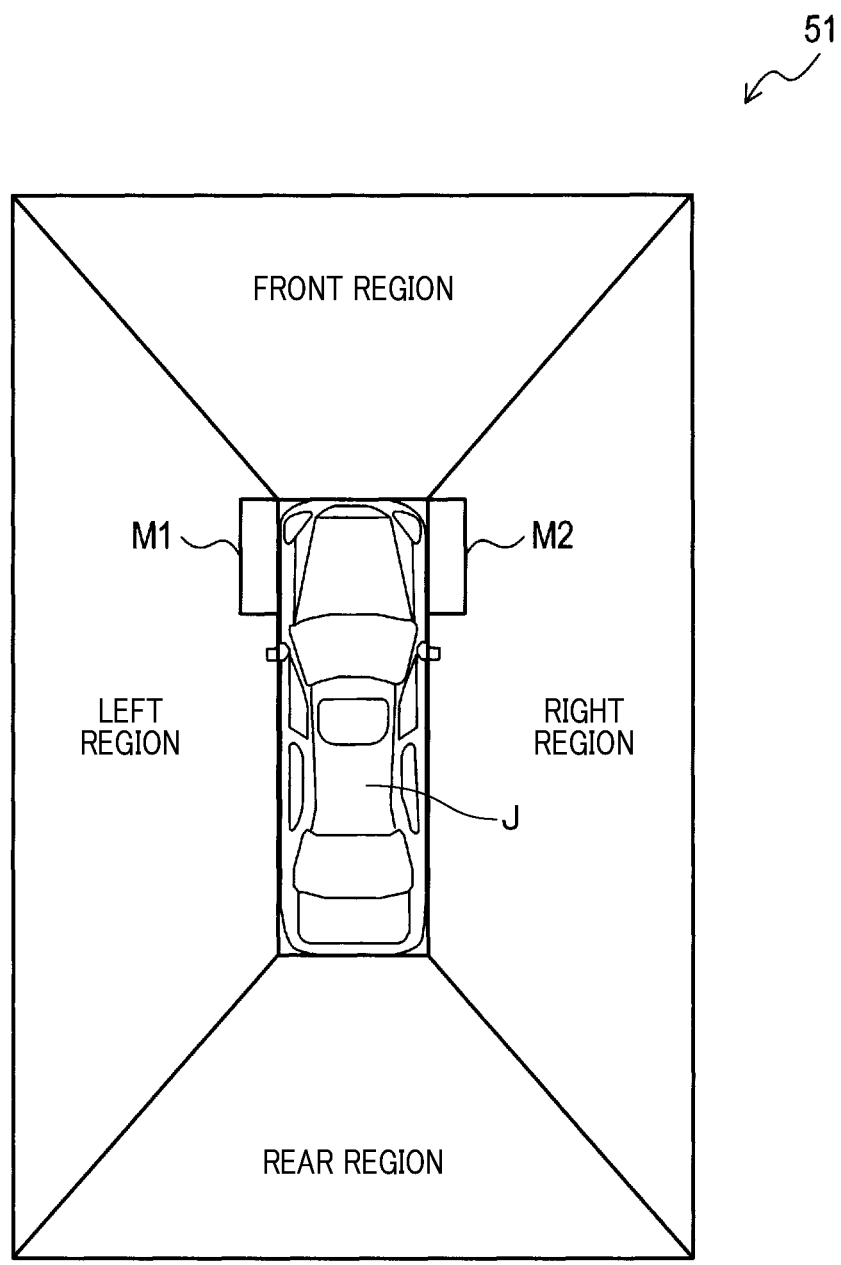
FIG. 4 is an explanatory diagram showing an image displayed on the display screen of a display.

As shown in FIG. 4, on the display screen 51 of the display 13, an image as viewed from above the own vehicle J is displayed at the center thereof.

In addition, a synthesized image constituted by images such as the bird's-eye view images obtained from the camera images captured by the cameras 5 to 11 is displayed around the own vehicle J.

This synthesized image is an image composed of images of four trapezoid regions, that is, a rectangular frame-like image with a space at the central part thereof where the own vehicle J is displayed.

Specifically, a bird's-eye view image of the camera image captured by the front camera 5 (that is, a front bird's-eye view image) is displayed in the trapezoid region in front of the own vehicle J (that is, the front region).

A bird's-eye view image of the camera image captured by the rear camera 7 (that is, a rear bird's-eye view image) is displayed in the trapezoid region behind the own vehicle J (that is, the rear region).

A bird's-eye view image of the camera image captured by the left camera 9 (that is, a left bird's-eye view image), or a corrected image obtained by correcting the left bird's-eye view image (that is, the left corrected image) is displayed in the trapezoid region on the left of the own vehicle J (that is, the left region).

A bird's-eye view image of the camera image captured by the right camera 11 (that is, a right bird's-eye view image), or a corrected image obtained by correcting the right bird's-eye view image (that is, the right corrected image) is displayed in the trapezoid region on the right of the own vehicle 3 (that is, the right region).

In particular, in this first embodiment, for example, an area in the left bird's-eye view image that covers the entire area where the left front wheel is displayed is set as the left masked area M1. Thus, for example, when the steering wheel is rotated to the left, and therefore the steering angle of the left front wheel becomes equal to or larger than a predetermined value, a replacement image such as a history image described later is placed and displayed over the masked area M1 to create the left corrected image.

The masked area M1 may be a rectangle that covers the image of the protruding left front wheel. For example, a rectangular area extending in the front-rear direction with a given width from the left edge of the own vehicle J can be adopted. Further, the front-rear range of the masked area M1 may have a front end corresponding to the front edge of the own vehicle J and a rear end corresponding to the rear edge of the front wheel when the steering angle is 0°.

Similarly, an area in the right bird's-eye view image that covers the entire area where the right front wheel is displayed is set as the left masked area M2. Thus, for example, when the steering wheel is rotated to the right, and therefore the steering angle of the right front wheel becomes equal to or larger than a predetermined value, a replacement image such as a history image is placed and displayed over the masked area M2 to create the left corrected image.

The masked area M2 on the right side is set so that it will be symmetrical with the masked area M1 on the left side when viewed from above. Therefore, its shape, size, and position are also symmetrical with those of the left masked area M1.

As described above, the synthesized image is a combination of the front bird's-eye view image, the rear bird's-eye view image, the left bird's-eye view image or the left corrected image, and the right bird's-eye view image or the right corrected image. In actual use, image processing is performed to make the boundary of each image inconspicuous.

Here, for example, each boundary between adjacent images is set to be inclined at an angle of 45° with respect to the front-rear direction of the own vehicle J from one of the four corners of the image of the own vehicle J, so that each image has a trapezoidal shape.

[1-3. Processing]

Next, the processing performed by the display control device 3, that is, a display control process for displaying a synthesized image, etc. on the display screen 51 of the display 13 will be described.

<Display Control Process>

This display control process is repeatedly executed at certain time intervals.

Figure 5:
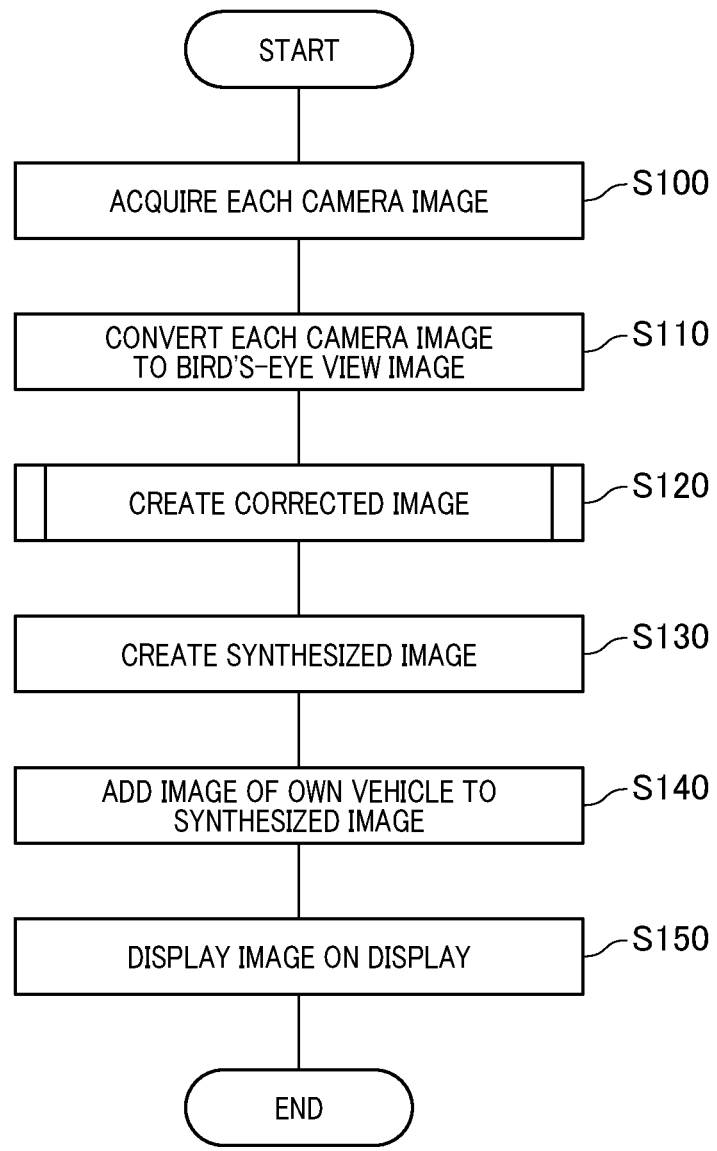
FIG. 5 is a flowchart showing a display control process executed by the display control device.

As shown in FIG. 5, in step 100, camera images captured by the cameras 5 to 11 are acquired from the cameras 5 to 11.

In the following step 110, the bird's-eye view conversion unit 33 performs bird's-eye view conversion on each camera image to create a well-known bird's-eye view image as viewed from above the own vehicle J.

In the following step 120, the image correction unit 43 performs a process of creating a corrected image described later.

In the following step 130, the image synthesis unit 35 combines the corrected images and the bird's-eye view images to create a synthesized image. Specifically, as shown in FIG. 4, the left corrected image or the right corrected image and the other bird's-eye view images are combined to create a rectangular frame-like synthesized image.

In the following step 140, the display control unit 41 creates an image (that is, a display image) in which the image of the own vehicle J is placed and displayed at the center of the synthesized image.

In the following step 150, the display image in which the own vehicle J is placed and displayed at the center of the synthesized image is displayed on the display 13, and the process is temporarily terminated.

<Corrected Image Creating Process>

Next, the process of creating a corrected image such as a left corrected image or a right corrected image executed in step 120 will be described.

Figure 6:
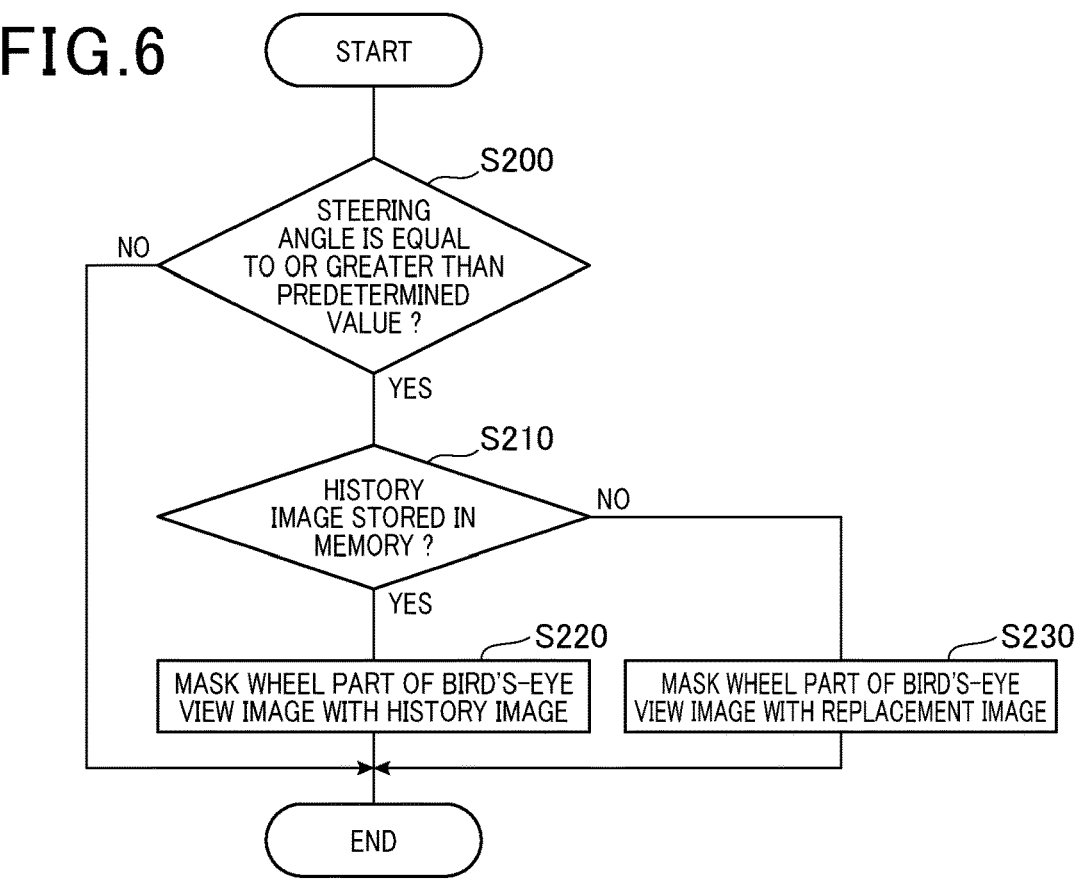
FIG. 6 is a flowchart showing a process for creating a corrected image executed by the display control device.

As shown in FIG. 6 in step 200, based on a signal sent from the steering sensor 15, the steering determination unit 31 determines whether the steering angle of the wheel (that is, the front wheel) is greater than or equal to a predetermined value. When the result of the determination is affirmative, the process proceeds to step 210, and when the result is negative, the process is temporarily terminated.

In this example, the steering determination unit 31 also detects whether the steering angle is a result of a right rotation or left rotation of the steering wheel based on the signal from the steering sensor 15.

As described above, the steering angle is a value indicating the magnitude of the angle at which the wheel is inclined with respect to the front-rear direction of the own vehicle (that is, an absolute value). Specifically, it is an angle between the front-rear direction and the longitudinal direction when the wheel is viewed from above.

The predetermined value for determining this steering angle can be determined by evaluating through experiment or the like the level of steering angle that results in an image of a wheel that gives a sense of discomfort.

In step 210, since the steering angle is large, it is determined whether there is a history image in the EEPROM 27 which is a memory. When the result of the determination is affirmative, the process proceeds to step 220, and when the result is negative, the process proceeds to step 230.

In the EEPROM 27, the images of the surroundings of the own vehicle captured in the past are successively stored. Specifically, the left bird's-eye view images of the left camera 9 including the left masked areas M1 and the right bird's-eye view images of the right camera 11 including the right masked areas M2 are stored. Note that bird's-eye images of the left masked areas M1 and the right masked areas M2 may be stored.

In step 220, the image correction unit 43 masks, with the history image, an area (that is, the masked area) covering the wheel in the left or right bird's-eye view image in accordance with the direction in which the steering wheel is rotated, that is, the direction to which the vehicle is steered, so as to create a corrected image. That is, the image of the masked area is replaced with the history image to create a corrected image.

For example, when the steering wheel is rotated to the left and the steering angle becomes equal to or greater than the predetermined value, in order to erase the image of the wheel of the left front wheel, a history image corresponding to the left masked area M1 is placed over the left masked area M1 to create a left corrected image.

In this regard, a history image is not placed over the right masked area M2, but a corresponding history image may also be placed similarly to the left masked area M1.

When the steering wheel is rotated to the right and the steering angle becomes equal to or greater than the predetermined value, in order to erase the image of the wheel of the right front wheel, a history image of the right masked area M2 is placed over the right masked area M2 to create a right corrected image.

In this regard, a history image is not placed over the left masked area M1, but a history image may also be placed similarly to the right masked area M1.

However, in step 230, since there is no history image in the memory, another replacement image different from the history image is used, and similarly to the masking by the history image, the replacement image is placed over the masked area to create a corrected image.

For example, when the steering wheel is rotated to the left and the steering angle becomes equal to or greater than the predetermined value, a replacement image is placed over the left masked area M1 to create a left corrected image.

When the steering wheel is rotated to the right and the steering angle becomes equal to or greater than the predetermined value, a replacement image is placed over the right masked area M2 to create a right corrected image.

This replacement image is preferably an image similar to the image around the masked area. Thus, the color identification unit 37 identifies the color of the image around the masked area, and creates a replacement image painted with the same color or a color that is closest thereto, or a replacement image having a given image.

[1-4. Effects]

According to the present embodiment described above in detail, the following effects can be obtained.

(1a) According to the first embodiment, a bird's-eye view image is created from each of the camera images captured by each of the cameras 5 to 11. Then, it is determined whether the steering angle of the wheel of the own vehicle J is equal to or greater than a predetermined value. When the steering angle is equal to or greater than the predetermined value, a history image or another replacement image painted with a given color is placed over the corresponding masked area to create a corrected image. After that, the corrected image and the other bird's-eye view images are combined into a synthesized image, which is displayed on the display 13 together with an image showing the own vehicle J.

According to such configuration, for example, when the vehicle is steered largely, and thus the steering angle of a wheel is increased, the image of the wheel can be prevented from being displayed in the synthesized image showing the surroundings of the vehicle.

In other words, it is possible to prevent the display displaying, in the synthesized image showing the surroundings of the vehicle, a wheel deformed such that it protrudes greatly in a diagonal direction from a position different from the normal position of the wheel.

Therefore, even when a person in the vehicle views the display image displayed on the display 13, he or she is unlikely to feel a sense of discomfort.

Note that although it is preferable to set the masked area so that the image of the wheel is entirely erased, an effect of reducing the sense of wrongness can still be obtained when an image of a part of the wheel, for example, the front side of the greatly protruding part of the front wheel or the front part of the wheel is erased.

(1b) When a replacement image painted with a given color is placed over the masked area, since a color that is closest to the color of the vicinity of the masked area is used, there is an advantage that it gives less sense of discomfort.

[1-5. Relationship Between the Claims and the Embodiment]

In the above-described first embodiment, the own vehicle J, the cameras 5 to 11, the display 13, the display control device 3, the steering determination unit 31, the bird's-eye view conversion unit 33, the image synthesis unit 35, the history image storing unit 39, the image correction unit 43, and the display control unit 41 are respectively examples of the own vehicle, the camera, the display device, the display control device, the steering determination unit, the viewpoint converting unit, the image synthesis unit, the memory, the image correcting unit, and the display control unit of the present invention.

[2. Second Embodiment]

Next, the second embodiment will be described. The description of the same matters as those in the first embodiment will be omitted.

Since the hardware configuration of the second embodiment is similar to that of the first embodiment, the same features will be described using the same reference signs.

In the second embodiment, the image correction unit 43 changes the size of the masked area according to the steering angle.

Figure 7:
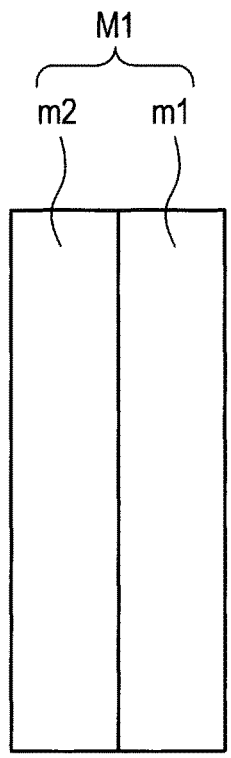
FIG. 7 is a plan view showing the shapes and sizes of masked areas set in a second embodiment.

For example, regarding a masked area M1 on the left of the front wheel of the own vehicle J, for example, as shown in FIG. 7, it is divided into a first masked area m1 and a second masked area m2, the former being closer to the own vehicle J (that is, on the right). It is also possible to divide it into more pieces.

The first masked area m1 and the second masked area m2 are obtained by dividing the masked area M1 into two equal parts so that they will be laterally symmetrical in FIG. 7. In addition, the first masked area m1 and the second masked area m2 are set so that the zone to be used differs according to the steering angle.

Specifically, when the steering angle is in the range of equal to or greater than the predetermined value and less than ½ of the maximum steering angle (that is, a first steering angle), the first masked area m1 is used as the masked area M1. That is, when the steering angle is small, since the wheel does not protrude much, the narrow first masked area m1 is used.

When the steering angle is between ½ of the maximum steering angle and the maximum steering angle (i.e., a second steering angle), both of the first masked area m1 and the second masked area m2 are used as the masked area M1.

That is, when the steering angle is large, since the wheel protrudes greatly, the wide first masked area m1 and second masked area m2 are used.

Next, the process of setting a masked area in the second embodiment will be described.

Figure 8:
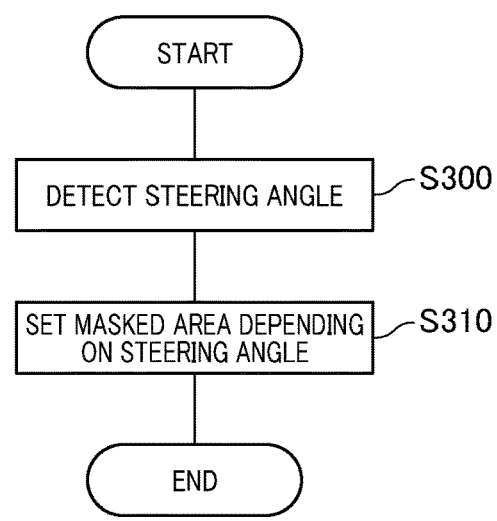
FIG. 8 is a flowchart showing a process for setting a masked area according to the steering angle in the second embodiment.

As shown in FIG. 8, in step 300, the steering sensor 15 detects the steering angle.

In the following step 310, a masked area M1 of a zone corresponding to the steering angle is set, and the process is temporarily terminated.

That is, when the steering angle is the first steering angle, the first masked area m1 is set as the masked area M1 over which the replacement image is placed, and when the steering angle is the second steering angle which is larger than the first steering angle, a masked area M1 that is a combination of the first masked area m1 and the second masked area m2 is set as the masked area M1 over which the replacement image is placed.

After setting the masked area M1 according to the steering angle, as in the first embodiment, a replacement image of a size corresponding to the set masked area M1 is placed to create a corrected image.

Here, the masked area M1 on the left of the front wheel of the own vehicle J is described as an example, but since the left and right masked areas M1, M2 are symmetrical, if the right masked area M2 is set symmetrically with the left masked area M1, it is possible to create a corrected image similarly for the right masked area M2.

In the second embodiment, the image correction unit 43 sets the masked area in accordance with the magnitude of the steering angle, more specifically, so that the masked area becomes larger as the magnitude of the steering angle increases. Therefore, it is possible to set a masked area with an area that is as small as possible in accordance with the protruding state of the wheel, and the sense of discomfort can be further reduced in addition to the effect of the first embodiment.

[3. Third Embodiment]

Next, the third embodiment will be described. The description of the same contents as those in the first embodiment will be omitted.

Since the hardware configuration of the third embodiment is similar to that of the first embodiment, the same features will be described using the same reference signs.

In the third embodiment, instead of providing the masked area described in the first embodiment, when the steering angle is equal to or larger than a predetermined value, the image of the own vehicle J is displayed largely so as to cover the masked area.

Figure 9:
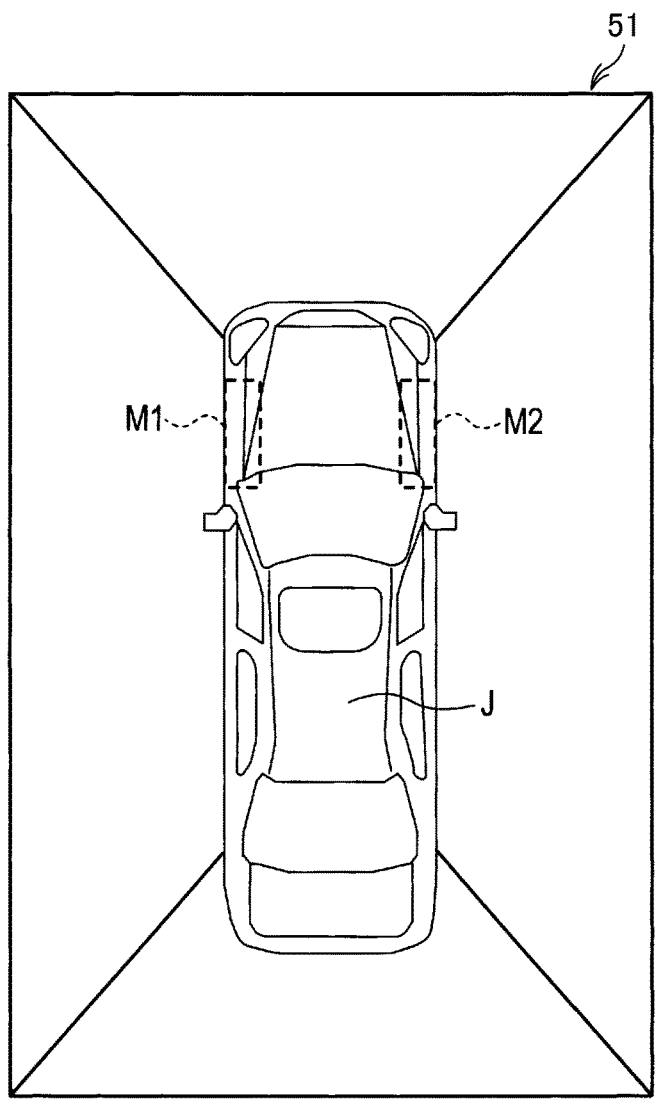
FIG. 9 is an explanatory diagram showing an image displayed on the display screen of a display in a third embodiment.

Specifically, as shown in FIG. 9, when the steering angle is equal to or greater than the predetermined value, the own vehicle J is displayed at the center of the display screen 51, and the size of the own vehicle J is larger than that of the own vehicle of the first embodiment shown in FIG. 4.

That is, when the steering angle is less than the predetermined value, as shown in FIG. 4, the own vehicle J is displayed with a small image at the center of the display screen 51, and a synthesized image including a corrected image in which replacement images are placed over the left and right masked areas M1 and M2.

When the steering angle is equal to or larger than the predetermined value, as shown in FIG. 9, a large own vehicle J is placed in the synthesized image with such a size that covers the masked areas M1 and M2 in FIG. 4. The synthesized image of the surroundings is used without enlarging it and with the same magnification.

In the third embodiment, the image correction unit 43 sets the image of the own vehicle in accordance with the magnitude of the steering angle. More specifically, the image correction unit sets the image of the own vehicle so as to become larger as the magnitude of the steering angle increases. Therefore, it is possible to reduce the sense of discomfort further in addition to the effect of the first embodiment.

[4. Fourth Embodiment]

Next, the fourth embodiment will be described. The description of the same matters as those in the first embodiment will be omitted.

Since the hardware configuration of the fourth embodiment is similar to that of the first embodiment, the same features will be described using the same reference signs.

In the fourth embodiment, when the imaging areas of the cameras 5 to 11 overlap, the image correction unit 43 changes the blending ratio of the images of the cameras 5 to 11 whose imaging areas overlap, for example, the blending ratio of a blending, to create a synthesized image.

Figure 10:
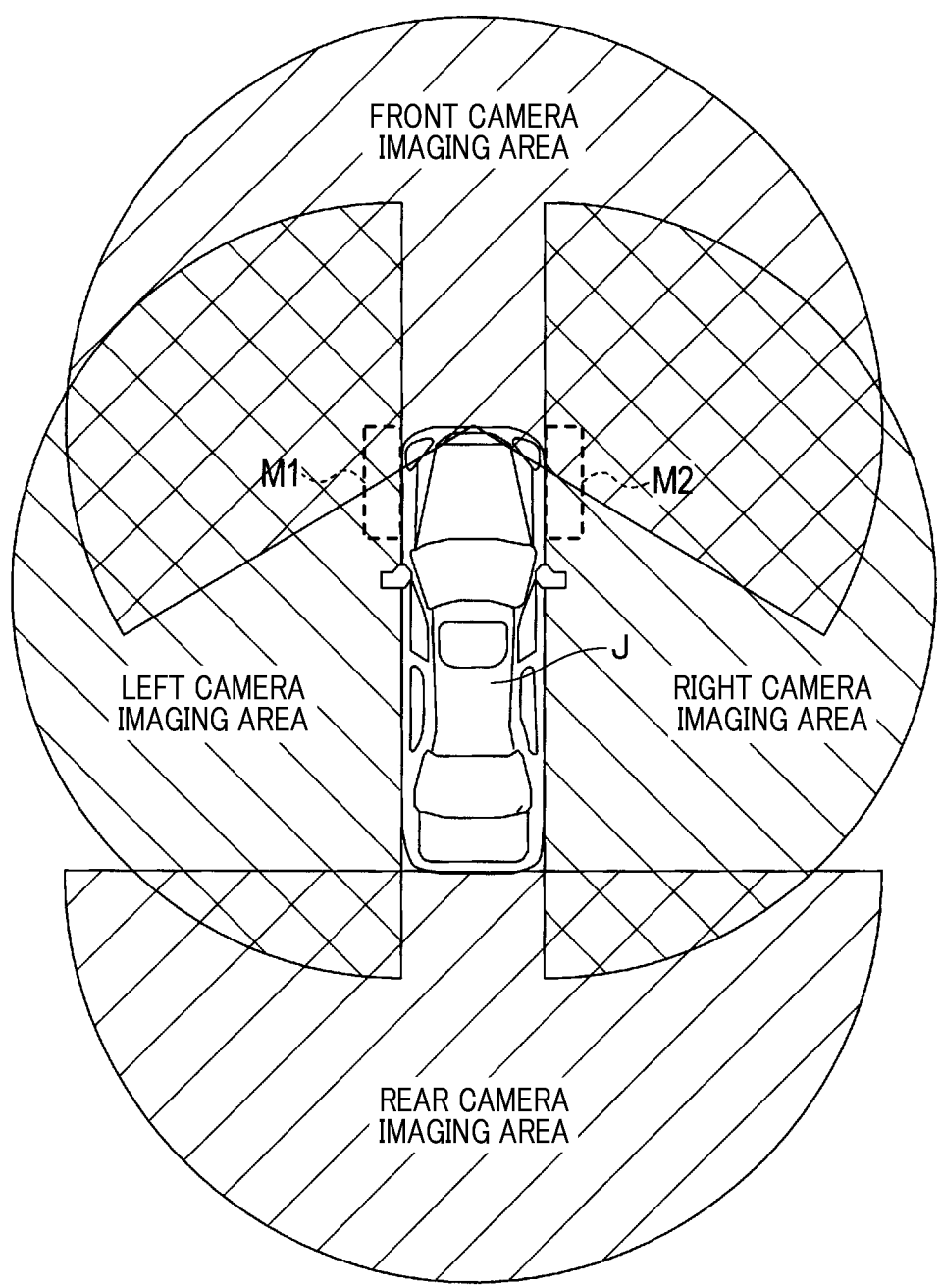
FIG. 10 is a plan view showing the imaging area of each camera and their overlapping zones in a fourth embodiment.

In the fourth embodiment, for example, as shown in FIG. 10, the imaging area of the front camera 5 is 180° or larger, and it overlaps with the front parts of the imaging areas of the left and right cameras 9, 11. Specifically, as a result, a part or the whole of the left and right masked areas M1 and M2 in the first embodiment is included in the overlapping part of the imaging areas.

In this case, in the part where the imaging areas overlap, the front bird's-eye view image blending ratio of the imaging area of the front camera 5 is set to 100%, and the blending ratios of the left bird's-eye view image and the right bird's-eye view image of the imaging areas of the left camera 9 and the right camera 11 are set to 0%.

That is, when the camera image captured by the front camera 5 is bird's-eye view converted, as compared with when the camera images captured by the left and right cameras 9, 11 are bird's-eye view converted, the wheel (that is, the front wheel) is less likely to appear, and therefore, there will be less distortion and positional shifting in the image of the wheel. Thus, the sense of discomfort arising from the displayed synthesized image is reduced.

[5. Other Embodiments]

An embodiment of the present invention has been described above. However, the present invention is not limited to the above-described embodiment, and various modes can be adopted as long as they fall within the technical scope of the present invention.

(5a) For example, in the above-described embodiments, masked areas are set for the left and right front wheels, but when the steering angle of the rear wheels changes, similarly to the above-described embodiments, masked areas may be set for the bird's-eye view images of the rear wheels to create and display corrected images.

In this case as well, the masked areas may be set so that a part or the whole of the image of the rear wheel that gives a sense of discomfort is not displayed.

(5b) The masked area may entirely cover the image of the wheel protruding from a side edge of the own vehicle, but for example, it is also possible to mask a part of the image of the wheel such as the front end side of the wheel protruding greatly.

(5c) Alternatively, instead of not displaying the image of the wheel in the masked area, the image of the wheel may be prevented from being displayed so as to be inconspicuous. For example, in order to make it difficult to recognize that it is a wheel, another image such as an image of another road surface may be superimposed, for example, semi-transparently on the image of the wheel in the masked area. In this regard, it is preferable to make the color of the masked area close to the color of the surrounding area. Alternatively, a pattern such as a mesh may be applied to the masked area.

(5d) Examples of replacement images other than the history image include an image painted with a given color, but it may be covered with another pattern or the like.

(5e) In the above embodiments, the steering angle is detected by the steering sensor, but the present invention is not limited to this. For example, since the image of the wheel changes depending on the steering angle, the steering angle may be determined from the bird's-eye view image or the like in which the wheel is shown.

(5f) The function of one constituent element in the above embodiment may be distributed to a plurality of constituent elements, or the functions of a plurality of constituent elements may be integrated into one constituent element. Further, a part of the configuration of the above embodiment may be omitted. Furthermore, at least a part of the configuration of the above embodiment may be added or substituted in the configuration of the other embodiments described above. The embodiments of the present invention include any mode included in the technical spirit specified by the language of the claims.

(5g) In addition to the above-described display control device, the present invention may be realized in various forms such as a system comprising the display control device, a program for causing a computer to function as the display control device, a non-transitory computer readable recording medium such as a semiconductor memory storing the program, and a display control method.

In addition, some or all of the functions executed by the display control device may be configured in a hardware manner, for example, by one or more ICs.

Although the present disclosure is described based on examples, it should be understood that the present disclosure is not limited to the examples and structures. The present disclosure encompasses various modifications and variations within the scope of equivalence. In addition, the scope of the present disclosure and the spirit include other combinations and embodiments, only one component thereof, and other combinations and embodiments that are more than that or less than that.

PARTIAL REFERENCE SIGNS LIST

3 . . . Display control device
5 . . . Front camera
7 . . . Rear camera
9 . . . Left camera
11 . . . Right camera
15 . . . Steering sensor
13 . . . Display
31 . . . Steering determination unit
33 . . . Bird's-eye view conversion unit
35 . . . Image synthesis unit
37 . . . Color identification unit
39 . . . History image storage unit
41 . . . Display control unit
43 . . . Image correction unit
J . . . Own vehicle

The invention claimed is:
1. A display control device comprising:
a viewpoint conversion unit which converts a viewpoint of images captured by a plurality of cameras mounted on an own vehicle to obtain viewpoint converted images as viewed from above the own vehicle;

a steering determination unit which determines whether a steering angle of a wheel of the own vehicle is equal to or greater than a predetermined value;

an image correction unit which, when the steering angle is equal to or greater than the predetermined value, creates a corrected image by processing a viewpoint converted image of the wheel in the viewpoint converted image so that display of the image of the wheel is suppressed;

an image synthesis unit which synthesizes the corrected image and at least one of the viewpoint converted images that is different from the corrected image to create a synthesized image; and a display control unit which displays the synthesized image and an image of the own vehicle at the position of the own vehicle on a display device.

2. The display control device according to claim 1, wherein
the corrected image is an image which displays, in the viewpoint converted image, a replacement image different from the image of the wheel at a masked area set so as to include an area where the image of the wheel is displayed.

3. The display control device according to claim 2, wherein
the replacement image displayed at the masked area is a history image of the masked area captured previously by one of the cameras.

4. The display control device according to claim 3, wherein
the image correction unit determines whether the history image is stored in a memory, and, when the history image is stored, displays the history image as the replacement image at the masked area, and, when the history image is not stored, displays another replacement image that is different from the history image at the masked area.

5. The display control device according to claim 4, wherein
the replacement image displayed at the masked area is a replacement image having a given color or pattern.

6. The display control device according to claim 4, wherein
the image correction unit increases the masked area as the steering angle increases.

7. The display control device according to claim 3, wherein
the image correction unit increases the masked area as the steering angle increases.

8. The display control device according to claim 3, wherein
the image correction unit displays an image showing the own vehicle at the position of the own vehicle in the viewpoint converted image, and when the steering angle is equal to or greater than a predetermined value, enlarges the image of the own vehicle as compared with when the steering angle is less than the predetermined value.

9. The display control device according to claim 3, wherein
the image correction unit displays an image showing the own vehicle at the position of the own vehicle in the viewpoint converted image, and when the steering angle is equal to or greater than a predetermined value, enlarges the image of the own vehicle as compared with when the steering angle is less than the predetermined value.

10. The display control device according to claim 2, wherein
the replacement image displayed at the masked area is a replacement image having a given color or pattern.

11. The display control device according to claim 10, wherein
the image correction unit creates the replacement image based on an image of an area around the masked area.

12. The display control device according to claim 2, wherein
the image correction unit increases the masked area as the steering angle increases.

13. The display control device according to claim 2, wherein
the image correction unit displays an image showing the own vehicle at the position of the own vehicle in the viewpoint converted image, and when the steering angle is equal to or greater than a predetermined value, enlarges the image of the own vehicle as compared with when the steering angle is less than the predetermined value.

14. The display control device according to claim 2, wherein
the steering angle is detected based on a signal from a steering sensor or the image of the wheel.

15. The display control device according to claim 1, wherein
the image correction unit displays an image showing the own vehicle at the position of the own vehicle in the viewpoint converted image, and when the steering angle is equal to or greater than a predetermined value, enlarges the image of the own vehicle as compared with when the steering angle is less than the predetermined value.

16. The display control device according to claim 1, wherein
when there is an area showing the image of the wheel in a zone where imaging areas of the cameras overlap, the image correction unit changes a blending ratio of the images of the cameras whose imaging areas overlap to suppress the display of the image of the wheel.

17. The display control device according to claim 1, wherein
the steering angle is detected based on a signal from a steering sensor or the image of the wheel.

18. A display control method comprising steps of:
a viewpoint conversion step of converting a viewpoint of images captured by a plurality of cameras mounted on an own vehicle to obtain viewpoint converted images as viewed from above the own vehicle;

a steering determination step of determining whether a steering angle of a wheel of the own vehicle is equal to or greater than a predetermined value;

an image correction step of, when the steering angle is equal to or greater than the predetermined value, creating a corrected image by processing a viewpoint converted image of the wheel in the viewpoint converted image so that the image of the wheel is prevented from being displayed;

an image synthesis step of synthesizing the corrected image and at least one of the viewpoint converted images that is different from the corrected image to create a synthesized image; and a display control step of displaying the synthesized image and an image of the own vehicle at the position of the own vehicle on a display device.

19. The display control method according to claim 18, wherein
the image correction step increases a masked area set so as to include an area showing the image of the wheel as the steering angle increases.

20. The display control method according to claim 18, wherein
the image correction step displays an image showing the own vehicle at the position of the own vehicle in the viewpoint converted image, and when the steering angle is equal to or greater than a predetermined value, enlarges the image of the own vehicle as compared with when the steering angle is less than the predetermined value.

* * * * *